US011948207B1

(12) United States Patent
Sankararaman et al.

(10) Patent No.: US 11,948,207 B1
(45) Date of Patent: Apr. 2, 2024

(54) MACHINE LEARNING BASED APPROACH FOR RECOMMENDING DIFFERENT CATEGORIES OF TAX DEDUCTIBLE EXPENSES AND RELATED EXAMPLES OF TAX DEDUCTIBLE EXPENSES FOR EACH CATEGORY

(71) Applicant: INTUIT INC., Mountain View, CA (US)

(72) Inventors: Shankar Sankararaman, Burlingame, CA (US); Lan Jin, Sunnyvale, CA (US); Shivani Gowrishankr, Santa Clara, CA (US); Jaspreet Singh, Union City, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/362,604

(22) Filed: Jul. 31, 2023

(51) Int. Cl.
  *G06Q 40/00* (2023.01)
  *G06Q 40/10* (2023.01)

(52) U.S. Cl.
  CPC .................... *G06Q 40/10* (2013.01)

(58) Field of Classification Search
  CPC ...................................................... G06Q 40/10
  See application file for complete search history.

(56) References Cited

U.S. PATENT DOCUMENTS

| | | | | |
|---|---|---|---|---|
| 7,539,635 B1 * | 5/2009 | Peak | ....................... | G06Q 10/00 705/31 |
| 8,478,671 B1 * | 7/2013 | Tifford | ................... | G06Q 40/10 705/35 |
| 10,664,925 B2 * | 5/2020 | Wang | ................... | G06Q 40/123 |
| 10,861,106 B1 * | 12/2020 | Hunt | ..................... | G06Q 40/123 |
| 11,354,755 B2 * | 6/2022 | Goldman | .............. | G06Q 40/123 |
| 2011/0264569 A1 * | 10/2011 | Houseworth | .......... | G06Q 40/00 705/31 |
| 2011/0264570 A1 * | 10/2011 | Houseworth | .......... | G06Q 40/00 705/31 |
| 2013/0198047 A1 * | 8/2013 | Houseworth | ........ | G06Q 40/123 705/31 |

(Continued)

FOREIGN PATENT DOCUMENTS

WO  WO-2016039779 A1 *  3/2016  ........... G06Q 40/123

OTHER PUBLICATIONS

Adams, "10 Popular Tax Deductions," www.turbotax.intuit.com, 2022, (Year: 2022).*

(Continued)

*Primary Examiner* — Abhishek Vyas
*Assistant Examiner* — William B. Bunker
(74) *Attorney, Agent, or Firm* — Patterson + Sheridan, LLP

(57) ABSTRACT

A method for automatically recommending to a user of a software application one or more categories of a plurality of different categories of tax deductible expenses includes providing input data to a trained machine learning model and receiving output from the trained machine learning model based on the input data. The output includes a recommendation for the user that includes (i) one or more categories of the plurality of different categories of tax deductible expenses; and (ii) a plurality of examples of tax deductible expenses for each of the one or more categories. The method includes receiving feedback from the user on the recommendation and generating updated training data for the trained machine learning model based on the feedback.

14 Claims, 5 Drawing Sheets

| | | | | | | |
|---|---|---|---|---|---|---|
| Third Dataset 144 ||||||||
| User ID 200 | First Context Feature 222 | nTH Context Feature 222 | Industry 224 | Expense Category & Examples 212, 214 | Timestamp 226 | Selection 220 |
| First ID | | ... | | [Category 1, Examples]; [Category 2, Examples]... | | [selected ,not selected] |
| Second ID | | ... | | [Category 1, Examples]; [Category 2, Examples]... | | [selected ,not selected] |
| ... | | ... | | [Category 1, Examples]; [Category 2, Examples]... | | [selected ,not selected] |
| nth ID | | ... | | [Category 1, Examples]; [Category 2, Examples]... | | [selected ,not selected] |

(56) References Cited

U.S. PATENT DOCUMENTS

2016/0350870 A1* 12/2016 Morin .................. G06N 20/00
2017/0004583 A1*  1/2017 Wang .................. G06Q 40/123
2017/0300933 A1* 10/2017 Mascaro ................ G06N 7/01
2017/0308960 A1* 10/2017 Mascaro ............. G06Q 40/123

OTHER PUBLICATIONS

Scrivastava, "Yes, Machine Learning Can Help Make Tax Preparation Less Painful," Intuit Blog, Innovative Thinking, 2017 (Year: 2017).*

* cited by examiner

| First Dataset 140 |||||
|---|---|---|---|---|
| User ID 200 | First User-Specific Feature 202 | ... | nTH User-Specific Feature 202 ||
| First ID |||||
| Second ID || ... |||
| ... |||||
| nth ID |||||

FIG. 2A

| Second Dataset 142 ||||
|---|---|---|---|
| Expense ID 216 | Expense Category 210 | Expense Examples 212 | Relevant Industries 214 |
| #_# | Title | Example 1, 2, 3... | Industry 1, 2, 3... |
| ##_# | Title | Example 1, 2, 3... | Industry 1, 2, 3... |
| ##_# | Title | Example 1, 2, 3... | Industry 1, 2, 3... |

FIG. 2B

| Third Dataset 144 |||||||
|---|---|---|---|---|---|---|
| User ID 200 | First Context Feature 222 | ... | nTH Context Feature 222 | Industry 224 | Expense Category & Examples 212, 214 | Timestamp 226 | Selection 220 |
| First ID ||| ... || [Category 1, Examples]; [Category 2, Examples]... || [selected, not selected] |
| Second ID ||| ... || [Category 1, Examples]; [Category 2, Examples]... || [selected, not selected] |
| ... ||| ... || [Category 1, Examples]; [Category 2, Examples]... || [selected, not selected] |
| nth ID ||| ... || [Category 1, Examples]; [Category 2, Examples]... || [selected, not selected] |

FIG. 2C

Training Data 130

| User ID 200 | First User-Specific Feature 202 | ... | nth User-Specific Feature 202 | First Context Feature 222 | ... | nTH Context Feature 222 | Industry 224 | Timestamp 226 | Expense ID 216 | Expense Category 210 | Expense Examples 212 | Relevant Industries 214 | Selection 220 |
|---|---|---|---|---|---|---|---|---|---|---|---|---|---|
| First ID | | | | | | | Industry A | YY-MM-DD | First Expense ID | First Category | 1st Example, 2nd Example… | First Industry, Second Industry… | Yes |
| | | | | | | | | | Second Expense ID | Second Category | 1st Example, 2nd Example… | First Industry, Second Industry… | No |
| ⋮ | ⋮ | | ⋮ | ⋮ | | ⋮ | ⋮ | ⋮ | ⋮ | ⋮ | ⋮ | ⋮ | ⋮ |
| Second ID | | | | | | | Industry B | YY-MM-DD | First Expense ID | First Category | 1st Example, 2nd Example… | First Industry, Second Industry… | No |
| | | | | | | | | | Second Expense ID | Second Category | 1st Example, 2nd Example… | First Industry, Second Industry… | Yes |
| ⋮ | ⋮ | | ⋮ | ⋮ | | ⋮ | ⋮ | ⋮ | ⋮ | ⋮ | ⋮ | ⋮ | ⋮ |
| nth ID | | | | | | | Industry C | YY-MM-DD | First Expense ID | First Category | 1st Example, 2nd Example… | First Industry, Second Industry… | No |

FIG. 3

MACHINE LEARNING BASED APPROACH FOR RECOMMENDING DIFFERENT CATEGORIES OF TAX DEDUCTIBLE EXPENSES AND RELATED EXAMPLES OF TAX DEDUCTIBLE EXPENSES FOR EACH CATEGORY

Aspects of the present disclosure relate to techniques for recommending to users (e.g., self-employed individuals) of a tax preparation software one or more categories of a plurality of different categories of tax deductible expenses along with related examples of tax deductible expenses for each of the one or more categories. In particular, embodiments involve training a machine learning model to provide such recommendations for a given user that are personalized for the user based on a plurality of different features (e.g., income, industry, recent life-events, historical tax data) unique to the user.

BACKGROUND

Every year millions of people around the world utilize software applications to assist with countless aspects of life. For example, people may use tax preparation software to assist in preparation of their tax return. Self-employed individuals using tax preparation software may be prompted to provide details regarding their self-employment, such as the industry in which the individual is self-employed. In this manner, the tax preparation software may generate a list of tax deductible expenses incurred by the individual.

However, the list of tax deductible expenses generated by tax preparation software is based on rules that are specific to the industry in which the individual is self-employed. The rules do not account for other details (e.g., total income, marital status, number of dependents, home purchase, etc.) about the individual's tax situation. Therefore, the list of tax deductible expenses generated by tax preparation software may not include one or more tax deductible expenses that are applicable to the individual given their specific tax situation. Furthermore, the challenge of maintaining and updating the rules year over year combined with the challenge of generating new rules for emerging industries makes this rules-based approach both resource-intensive and time-consuming.

What is needed are improved techniques for generating lists of tax deductible expenses for individuals, such as self-employed individuals, that are personalized based on details of the individual's specific tax situation.

BRIEF SUMMARY

Aspects and advantages of embodiments of the present disclosure will be set forth in part in the following description, or may be learned from the description, or may be learned through practice of the embodiments.

A method for automatically recommending to a user of a software application one or more categories of a plurality of different categories of tax deductible expenses and examples of tax deductible expenses for each of the one or more categories includes: providing, by one or more processors, input data to a trained machine learning model, the input data comprising a plurality of different features associated with the user, wherein the trained machine learning model was trained through a supervised learning process using training data generated based on past user interactions with the software application; receiving, by the one or more processors, output from the trained machine learning model based, at least in part, on the input data, the output from the trained machine learning model comprising a recommendation for the user, the recommendation including (i) one or more categories of the plurality of different categories of tax deductible expenses and (ii) a plurality of examples of tax deductible expenses for each of the one or more categories; receiving, by the one or more processors, feedback from the user on the recommendation; and generating, by the one or more processors, updated training data for the trained machine learning model based on the feedback, wherein the trained machine learning model is re-trained based on the updated training data.

Further embodiments include a non-transitory computer-readable storage medium storing instructions that, when executed by a computer system, cause the computer system to perform the method set forth above. Further embodiments include a system comprising at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2A depicts a first data set from which training data is generated for training a machine learning model to recommend one or more categories of a plurality of different categories of tax deductible expenses and examples of tax deductible expenses for each of the one or more categories according to some embodiments of the present disclosure.

FIG. 2B depicts a second data set from which training data is generated for training a machine learning model to recommend one or more categories of a plurality of different categories of tax deductible expenses and examples of tax deductible expenses for each of the one or more categories according to some embodiments of the present disclosure.

FIG. 2C depicts a third data set from which training data is generated for training a machine learning model to recommend one or more categories of a plurality of different categories of tax deductible expenses and examples of tax deductible expenses for each of the one or more categories according to some embodiments of the present disclosure.

FIG. 3 depicts training data that is used to train a machine learning model to recommend one or more categories of a plurality of different categories of tax deductible expenses and examples of tax deductible expenses for each of the one or more categories according to some embodiments of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
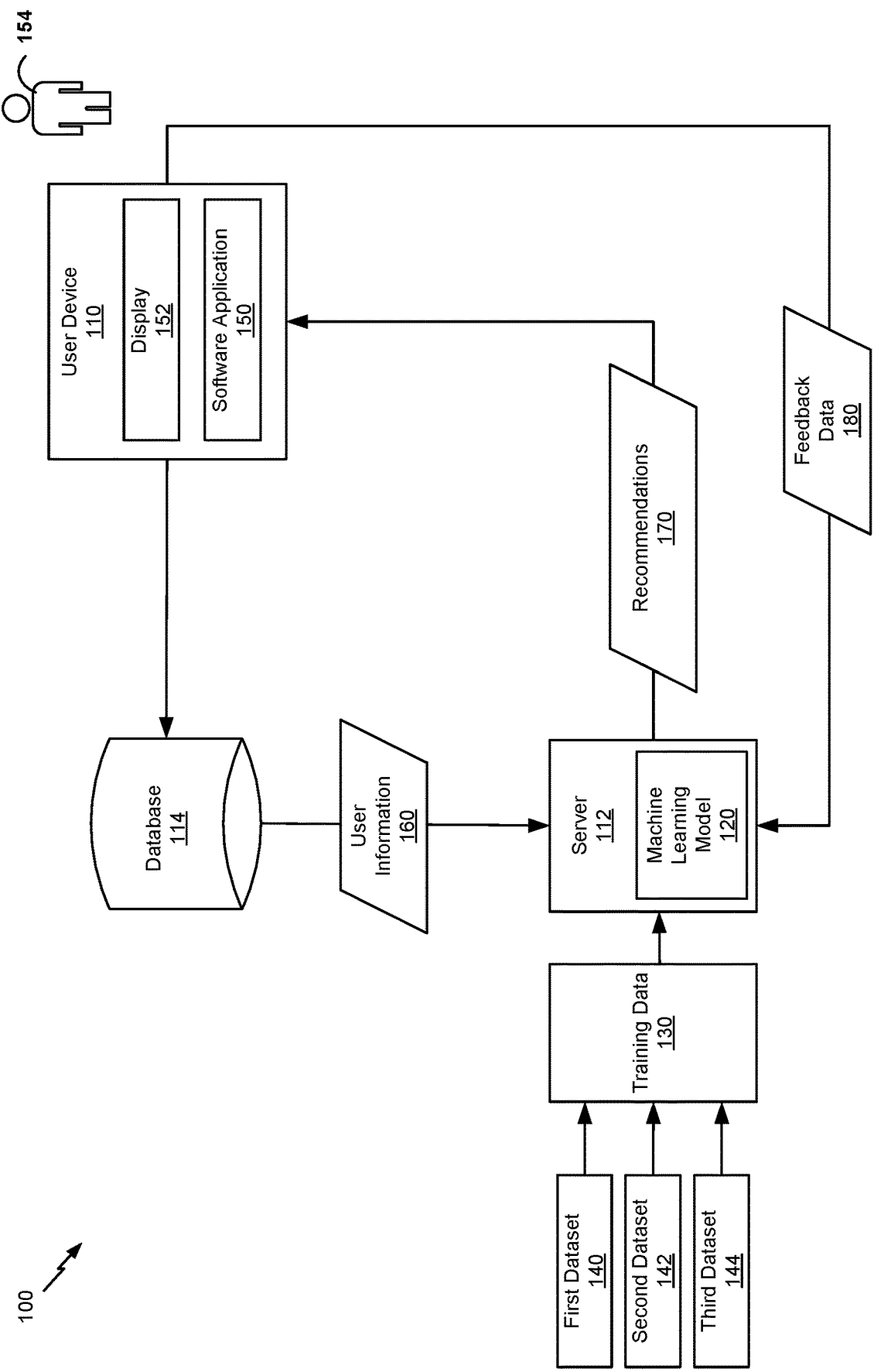
FIG. 1 depicts an example system for automatically recommending to a user of a software application one or more categories of a plurality of different categories of tax deductible expenses and examples of tax deductible expenses for each of the one or more categories according to some embodiments of the present disclosure.

Example aspects of the present disclosure are directed to techniques for recommending to users (e.g., self-employed individuals) of a software application (e.g., tax preparation software) one or more categories of a plurality of different categories of tax deductible expenses and related examples of tax deductible expenses for each of the one or more categories. For example, a machine learning model may be trained to provide such recommendations. Details of the training data that is generated based on users' prior interactions with the software application and provided to the machine learning model to train the same (that is, the machine learning model) to provide such recommendations will now be discussed in more detail.

In some embodiments, three separate datasets may be used to generate the training data. The three separate datasets may be a result of users' prior interactions with the software application. The first dataset (discussed below in more detail with reference to FIG. 2A) may include a unique identifier (e.g., tax-filer identification number) for each of a plurality of different users (e.g., self-employed individuals). The first dataset may also include a plurality of different features for each of the plurality of different users. The plurality of different features may include information from one or more prior tax filings (e.g., tax returns) of a corresponding user. For example, the information may include, without limitation, total income, total number of dependents, and a total number of deductions (e.g., tax deductible expenses) taken in the previous year.

The second dataset (discussed below in more detail with reference to FIG. 2B) may include the plurality of different categories of tax deductible expenses that are available in the software application. For example, the second dataset may include a first category of tax deductible expenses titled "Vehicle" for tax deductible expenses associated with vehicles. Furthermore, the second dataset may include examples of tax deductible expenses for each of the plurality of different categories of tax deductible expenses. For instance, examples of tax deductible expenses for the first category of tax deductible expenses titled "Vehicle" may include examples of tax deductible expenses (e.g., mileage, gas) associated with use of the vehicle for travel as well as examples of tax deductible expenses (e.g., oil change) associated with maintenance of the vehicle. The second dataset may also include a list of relevant industries for each of the plurality of different categories of tax deductible expenses. For instance, relevant industries for the first category of tax deductible expenses titled "Vehicle" may include, without limitation, rideshare services and daycare services.

The third dataset (discussed below in more detail with reference to FIG. 2C) may include, for each of the plurality of different users, data identifying which of the plurality of different categories of tax deductible expenses were selected in previous tax filings (e.g., tax returns) as well as data identifying which of the plurality of tax deductible expenses were not selected in previous tax filings. The third dataset may also include a plurality of different contextual features for each of the plurality of different users. For example, the plurality of contextual features may include data that is descriptive of recent life events (e.g., home purchase, job change, getting married) for a given user. Still further, for each of the plurality of different users, the third dataset may include industry information that is descriptive of an industry in which a given user is employed. In this manner, the contextual features and industry information for a given user may provide context for why the user did or did not select certain categories of the plurality of different categories of tax deductible expenses.

In some embodiments, the third dataset may also include timestamp data to indicate when (e.g., day, month, and year) the user selected or did not select a given category of tax deductible expenses. For instance, the timestamp may be determined based, at least in part, on clickstream data associated with a user interacting with the software application (e.g., tax preparation software) to prepare a tax return.

The training data (discussed below in more detail with reference to FIG. 3) may be generated based on the first, second, and third datasets. More specifically, the first, second, and third datasets may be combined to generate the training data that is then provided as an input to the machine learning model. In this manner, the machine learning model may be trained to recommend to users of the software application one or more of the categories of tax deductible expenses and related examples of tax deductible expenses for each of the one or more categories recommended for a given user. In some embodiments, the machine learning model may be a global binary classifier model. In this manner, a single machine learning model (that is, the global binary classifier model) may be used to generate recommendations for each of the plurality of different categories of tax deductible expenses instead of having multiple machine learning models, with each model trained to determine whether to generate a recommendation for a single category of tax deductible expenses. More specifically, the single machine learning model may, as mentioned above, be a global binary classifier model that is global in the sense that the global binary classifier model may encompass all of the different categories of tax deductible expenses and is binary is the sense that the global binary classifier model predicts whether a particular category of tax deductible expenses is relevant or not for a given user.

Once the machine learning model is trained, the machine learning model may operate in an inference mode in which the machine learning model recommends to a user (e.g., self-employed individual) of the software application (e.g., tax preparation software) one or more categories of the plurality of different categories of tax deductible expenses as well as related examples of tax deductible expenses for each of the one or more categories of tax deductible expenses based on data (e.g., unique identifier, total income, industry, contextual features, etc.) that is unique to the user. For instance, in some embodiments, the software application may include a graphical user interface on a display of a user device (e.g., desktop, laptop, tablet, smartphone). Furthermore, the output (e.g., recommendation of one or more categories of tax deductible expenses and related examples of tax deductible expenses for each of the one or more categories) of the machine learning model may be displayed (e.g., via the display of the user device) for viewing by the user.

In some embodiments, the user may provide feedback on the recommendation. For instance, the user may opt to select one or more of the recommended categories of tax deductible expenses. Additionally, the user may opt to not select (e.g., forego) one or more of the recommended categories of deductible expenses. In some embodiments, updated training data may be generated based on the feedback from the user, and the machine learning model may be re-trained based on the updated training data. In this manner, the machine learning model may be iteratively re-trained through by user interactions with the software application and, as a result of the re-training, may provide improved (e.g., more accurate) recommendations.

In some embodiments, the machine learning model may receive the feedback (e.g., selection and non-selection for each of the recommended categories of tax deductible expenses) from the user in real-time and therefore the updated training data for the machine learning model may be generated in real-time and the machine learning model may be re-trained in real-time. In alternative embodiments, the feedback may be provided to a database and the updated training data may be generated in batch (that is, all at once) at a later time.

Example aspects of the present disclosure provide numerous technical effects and benefits. For instance, since the training data used to train the machine learning model is based on prior user interactions with the software application and therefore includes a plurality of different features (e.g., total income, dependents, home ownership, number of deductions taken in previous tax filings) for a plurality of different users (e.g., self-employed individuals) across a plurality of different industries, the recommendation of one or more categories of tax deductible expenses and related examples of tax deductible expenses for each of the one or more categories output by the machine learning model for a user interacting with the software application may be improved (e.g., more accurate) compared to recommendations made by conventional software applications utilizing a rules-based approach that do not account such features when recommending one or more of the categories of tax deductible expenses.

Furthermore, by utilizing a single machine learning model (e.g., a global binary classifier model) to generate the recommendation of one or more categories of tax deductible expenses instead of having multiple machine learning models, with each model trained to determine whether to generate a recommendation for a single category of tax deductible expenses, embodiments of the present disclosure avoid the computing resource utilization that would otherwise be associated with training and using multiple machine learning models, and thereby improve the functioning of the computing systems involved. Additionally, by improving the accuracy of recommendations output by the machine learning model, techniques described herein avoid the computing resource utilization that would otherwise be associated with generating and providing inaccurate recommendations that would require additional actions from the user to identify correct categories and additional processing to handle such actions.

Machine Learning Based System for Automatically Recommending Different Categories of Tax Deductible Expenses and Related Examples of Tax Deductible Expenses for each Category FIG. 1 illustrates components of a system 100 for automatically recommending to users of a software application (e.g., tax preparation software) one or more categories of a plurality of different categories of tax deductible expenses and related examples of tax deductible expenses for each of the one or more categories according to some embodiments of the present disclosure. For instance, the system 100 may include a user device 110, a server 112, and a database 114. It should be appreciated that the user device 110, the server 112, and the database 114 may be communicatively coupled with one another via one or more networks (not shown). The network(s) may include, without limitation, a wide area network (WAN), a local area network (LAN), and/or a cellular network.

In some embodiments, the server 112 may include a machine learning model 120. The machine learning model 120 may be trained to recommend to users of a software application (e.g., tax preparation software) one or more categories of tax deductible expenses and related examples of tax deductible expenses for each of the one or more categories. For instance, the machine learning model 120 may receive training data 130 that is generated based on a first dataset 140, a second dataset 142, and a third dataset 144. The training data 130 may include context-specific data for a plurality of different users across a plurality of industries. More details regarding specifics of the training data 130 and the first, second and third datasets 140, 142, 144 from which the training data 130 is generated will be discussed in more detail with reference to FIGS. 2A-2C and FIG. 3.

As shown, the user device 110 may include a software application 150 (e.g., tax preparation software). In some embodiments, the software application 150 may be running locally on the user device 110. In alternative embodiments, the software application 150 may be executed on a remote device (e.g., cloud computing device). A graphical user interface (not shown) associated with the software application 150 may be displayed on a display 152 of the user device 110. In this manner, a user 154 (e.g., self-employed individual) may interact (e.g., provide input) with the software application 150 via the graphical user interface.

In some embodiments, the user 154 may provide input that prompts the software application 150 to provide information 160 about the user 154 to the machine learning model 120. For instance, the input may be the user 154 providing credentials (e.g., username and password) associated with logging into the software application 150. In some embodiments, the information 160 may include data from a prior tax filing (e.g., tax return) of the user 154 that is stored on the database 114. Examples of such data may include, without limitation, an industry in which the user 154 is self-employed, a total income of the user 154, whether the user 154 has any dependents, and any other suitable type of contextual information that may be included in the prior tax filing of the user 154. In some embodiments, the software application 150 may prompt (e.g., via an application programming interface (API) call) the database 114 to provide the information 160 to the server 112 for use as an input to the machine learning model 120.

The machine learning model 120 may be configured to output a recommendation 170 to the user 154. The recommendation 170 may include one or more categories of a plurality of different categories of tax deductible expenses and related examples of tax deductible expenses for each of the one or more categories based, at least in part, on the information 160 about the user 154. For instance, the recommendation 170 may be provided to the user device 110 and displayed thereon (e.g., via the display 152) for viewing by the user 154. As will be discussed below in more detail, the recommendation 170 may include data indicative of an identifier (e.g., title) for each of the one or more categories.

In some embodiments, the user 154 may provide feedback 180 (e.g., selection or no-selection) of the one or more categories of tax deductible expenses and related examples of tax deductible expenses for each of the one or more categories. For example, in some embodiments, the machine learning model 120 may recommend a first category of tax deductible expenses and related examples of tax deductible expenses for the first category as well as a second category of tax deductible expenses and related examples of tax deductible expenses for the second category. In such embodiments, the feedback 180 provided by the user 154 for the first category of tax deductible expenses and the second category of tax deductible expenses may include data indicative of whether the user accepted (e.g., selected) or declined each of the recommendation for the first category of tax deductible expenses and the recommendation for the second category of tax deductible expenses. In some embodiments, the user 154 may accept the first category of tax deductible expenses and decline the second category of tax deductible expenses. In such embodiments, the feedback 180 may include data indicating acceptance of the recommendation for the first category of tax deductible expenses. Furthermore, in some embodiments, the feedback 180 may further include data indicating non-acceptance of the recommendation for the second category of tax deductible expenses.

Training Data for Machine Learning Model

FIGS. 2A-2C illustrate the first dataset 140, the second dataset 142, and the third dataset 144 from which the training data 130 (FIG. 1) that is used to train the machine learning model 120 (FIG. 1) is provided according to some embodiments of the present disclosure. Details of each of the first, second, and third datasets 140, 142, 144 will now be discussed in more detail.

As shown, the first dataset 140 includes a unique identifier 200 (e.g., tax-filer identification number) for each of a plurality of different users (e.g., self-employed individuals) of a software application (such as the software application 150 discussed above with reference to FIG. 1). The first dataset 140 also includes a plurality of different features 202 for each of the plurality of different users. The plurality of different features 202 may include information from one or more prior tax filings (e.g., tax returns). For example, the information may include, without limitation, total income, total number of dependents, and total number of deductible expenses taken in the previous year.

The second dataset 142 may include a plurality of different categories 210 of tax deductible expenses. For example, the plurality of different categories 210 of tax deductible expenses may include a first category for tax deductible expenses associated with a vehicle. Additionally, the plurality of different categories 210 may include a second category for tax deductible expenses associated with an asset other than a vehicle.

In order to further define each of the plurality of different categories 210 of deductible expenses, the second dataset 142 may, as shown, include one or more examples 212 of tax deductible expenses for each of the plurality of different categories 210 of tax deductible expenses. For example, the example(s) 212 of tax deductible expenses included in the first category of tax deductible expenses may include tax deductible expenses associated with use of the vehicle for travel. For example, tax deductible expenses associated with use of the vehicle for travel may include a tax deductible expense associated with a number of miles the vehicle was driven by the self-employed individual, a tax deductible expense associated with an amount of gas consumed by the vehicle while being used for travel, or both. Alternatively, or additionally, the example(s) 212 of tax deductible expenses may be associated with maintenance (e.g., oil change, tire rotation, etc.) of the vehicle.

The second dataset 142 may include a list 214 of relevant industries for each of the plurality of different categories of deductible expenses. For example, the list 214 of relevant industries for the first category of tax deductible expenses associated with vehicles may include, without limitation, the ridesharing industry and the daycare industry. It should be appreciated that the list 214 of relevant industries may provide context indicating which industries a category of deductible expenses may and may not be applicable.

The second dataset 142 may include a unique identifier 216 for each of the different categories 210 and related examples 212 of tax deductible expenses. For example, the second dataset 142 may include a first unique identifier (e.g., denoted by numbers) to denote a first category of the plurality of different categories 210 of tax deductible expenses as well as the examples 212 of tax deductible expenses for the first category. Likewise, the second dataset 142 may include a second unique identifier to denote a second category of the plurality of different categories 210 of tax deductible expenses as well as the examples 212 of tax deductible expenses for the second category.

The third dataset 144 may include, for each of the plurality of different users, selection data 220 identifying which of the plurality of different categories 210 of tax deductible expenses were selected in previous tax filings (e.g., tax returns) and which of the plurality of different categories 210 of tax deductible expenses were not selected in previous tax filings. The third dataset 144 may also include a plurality of different contextual features 222 for each of the plurality of different users. For example, the plurality of contextual features may include data that is descriptive of recent life events (e.g., home purchase, job change). Still further, for each of the plurality of different users, the third dataset 144 may include industry information 224 for each of the plurality of users. The industry information 224 may indicate in which industry a given user is self-employed. In this manner, the contextual features 222 and industry information 224 for the given user may provide context for why the user did or did not select a given expense category.

In some embodiments, the third dataset 144 may include timestamp data 226 to indicate when (e.g., day, month, and year) the user selected or did not select a given category of the plurality of different categories 210 of tax deductible expenses. For instance, the timestamp data 226 may be determined based, at least in part, on clickstream data associated with the user interacting with an application (e.g., tax preparation software) to prepare a tax return (e.g., a prior tax return).

FIG. 3 illustrates the training data 130 according to some embodiments of the present disclosure. As shown, the training data 130 include information from each of the first dataset 140 (FIG. 2A), the second dataset 142 (FIG. 2B), and the third dataset 144 (FIG. 2C). Furthermore, the training data 130 may include multiple records (e.g., rows) for each of the plurality of different users. For example, a first user of the plurality of different users may, as shown, include a first record (e.g., row 1) for a first category of the plurality of different categories 210 of tax deductible expenses that the first user did select as denoted by the selection data 220 and a second record (e.g., row 2) for a second category of the plurality of different categories 210 of tax deductible expenses that was not selected by the first user as denoted by the selection data 220. In this manner, the training data 130 may include a log of user-selections (and non-selections) of the plurality of different categories 210 of tax deductible expenses for each of the plurality of different users across the different industries so that the machine learning model 120 (FIG. 1) trained to generate recommendations of one or more categories of the plurality of different categories 210 of tax deductible expenses and related examples 212 of tax deductible expenses for each of the one or more categories may provide improved (e.g., more accurate and comprehensive) recommendations compared to conventional approaches based on a rules based approach that only accounts for one factor (that is, industry of the user).

Although the training data 130 is depicted as including timestamp data 226 for each of the records (e.g., rows) for each of the different users, it should be appreciated that, in alternative embodiments, the training data 130 may not include the timestamp data 226 as the machine learning model 120 (FIG. 1) may, in some embodiments, not require such data.

In some embodiments, the training data 130 may be pre-processed before being provided as an input to the machine learning model 120. For instance, in some embodiments, the selection data may be assigned either a first numerical value (e.g., a "1") or a second numerical value (e.g., a "0"). The first numerical value may indicate that the corresponding category of tax deductible expenses was selected by the user, whereas the second numerical value may indicate that the corresponding category was not-selected by the user.

In some embodiments, the industry information 224 for each of the plurality of users may be processed separately from the plurality of contextual features 222 for each of the plurality of users. This is due, at least in part, to the relative importance of the industry information 224 compared to the plurality of contextual features 222 in determining whether to recommend a category of tax deductible expenses and related examples of tax deductible expenses for the category to a user.

In some embodiments, training of the machine learning model 120 (FIG. 1) based on the training data 130 is a supervised learning process that involves providing training inputs (e.g., features 202, context features 222, industry information 224, timestamp 226, unique identifiers 216, categories 210, examples 212, list 214, and/or the like from training data instances in training data 130) as inputs to the machine learning model. The machine learning model processes the training inputs and outputs predictions (e.g., recommendations of one or more categories of tax deductible expenses and related examples of tax deductible expenses for each of the one or more categories) based on the training inputs. The predictions are compared to the known labels associated with the training inputs (e.g., which may be based on expense categories 210 and selections 220 in training data 130) to determine the accuracy of the machine learning model 120, and parameters of the machine learning model 120 are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model 120 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

Figure 4:
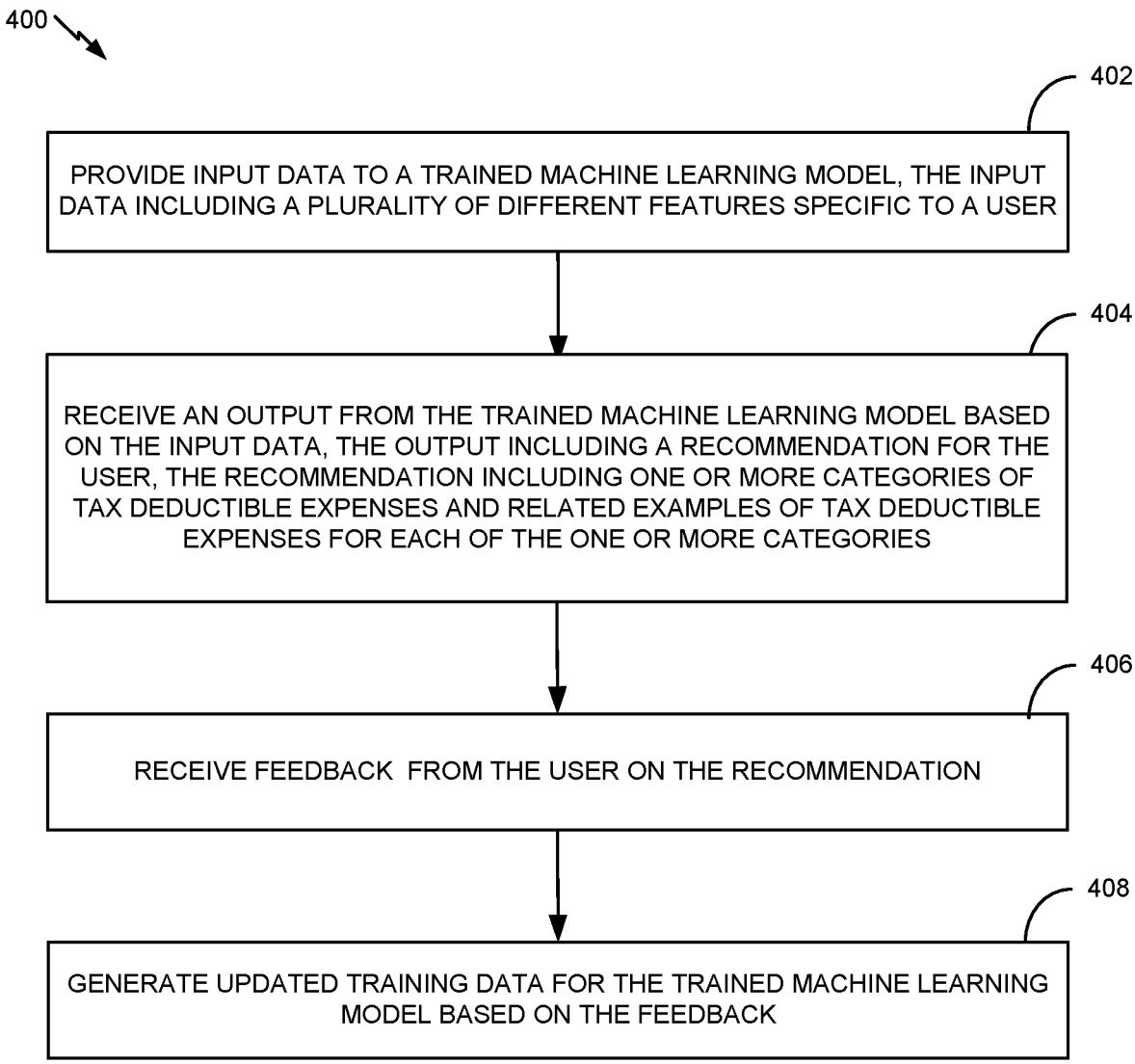
FIG. 4 depicts a flow diagram of a method of a machine learning based approach for automatically recommending to a user of a software application one or more categories of a plurality of different categories of tax deductible expenses and examples of tax deductible expenses for each of the one or more categories according to some embodiments of the present disclosure.

Flow Diagram of Method for Recommending to a User of a Software Application One or More Categories of a Plurality of Different Categories of Tax Deductible Expenses and Related Examples of Tax Deductible Expenses for the one or more Categories FIG. 4 is a flow diagram of an example method 400 of a machine learning based approach for recommending to a user (e.g., self-employed individual) of a software application (e.g., tax preparation software) one or more categories of a plurality of different categories of tax deductible expenses and related examples of tax deductible expenses for each of the one or more categories according to some embodiments of the present disclosure. The method 400 may be performed by instructions executing on a processor of a server (such as the server 112 of FIG. 1).

At (402), the method 400 may include providing input data to a trained machine learning model (such as the machine learning model 120 of FIG. 1). The input data may include a plurality of different features that are unique to a user interacting with the software application (such as the software application 150 in FIG. 1) to prepare a tax document (e.g., tax return). For instance, in some embodiments, the input data may include historical data from the user's prior interactions with the software application. Examples of the historical data may include, without limitation, total income of the user, number of dependents, and number of deductions selected in prior tax filings. The plurality of different features may also include contextual features indicative of one or more life-events for the user. Examples of such life-events may include, without limitation, a job change, a change in a marital status of the user, and/or purchase of real-property by the user. The plurality of different features may also include industry information for the user that identifies an industry in which the user is self-employed.

At (404), the method 400 may include receiving a recommendation for the user as an output of the machine learning model based on the input data provided at (402). For instance, the recommendation for the user may include one or more categories of a plurality of different categories of tax deductible expenses and related examples of tax deductible expenses for each of the one or more categories. It should be appreciated that the related examples of tax deductible expenses for each of the one or more categories may allow the user to better determine whether to accept (e.g., select) or decline the recommendation in whole (that is, decline all of the recommended categories of tax deductible expenses) or in part (that is, accept some of the categories of tax deductible expenses included in the recommendation and reject the remaining categories of tax deductible expenses included in the recommendation).

In some embodiments, the trained machine learning model may output duplicate recommendations for the same category of tax deductible expenses. For example, since each of the different categories of tax deductible expenses may include multiple different sets of example expenses, the trained machine learning model may, in some instances, recommend multiple instances of a first category of tax deductible expenses, with each of the multiple instances being for different sets of example tax deductible expenses for the first category. As an example, the first category may be for "supplies" and the first instance thereof may include examples of supplies (e.g., computer, printer, etc.) for an individual in a first industry (e.g., software engineering), whereas the second instance thereof may include examples of supplies (e.g., notebooks, markers, etc.) for an individual in a second industry (e.g., private tutor) that is different from the first industry. It should understood that the first instance of the first category and related examples (e.g., computer, printer, etc.) and the second instance of the first category and related examples (e.g., notebooks, markers, etc.) each have a unique identifier (such as the unique identifier 216 discussed above with reference to FIG. 2B). It should also be understood that the examples of tax deductible expenses for the first instance of the first category are different from the examples of tax deductible expenses for the second instance of the first category. As will now be discussed, the trained machine learning model may be configured to ensure the most relevant of the two instances of the first category is recommended to the user so that the user can maximize his/her deductions in his/her tax return.

In some embodiments, the trained machine learning model may generate a recommendation score for each of the multiple instances of a category of tax deductible expenses, such as the first category related to tax deductible expenses for supplies discussed above. In such embodiments, receiving the recommendations from the trained machine learning model may include determining the recommendation includes multiple instances of the category of tax deductible expenses (each instance having different examples) and comparing the recommendation score assigned to each of the multiple instances of the category to select the instance of the category of tax deductible expenses having the highest recommendation score as the selected instance of the category. It should be appreciated that the examples included in one instance of the category of tax deductible expenses may be more relevant to a user based on the industry of the user. As such, the trained machine learning model may assign a higher recommendation score to that particular instance of the category compared to each of the remaining instances of the category. In this manner, the trained machine learning model can ensure the expense IDs (e.g., unique identifier 216 for a given category 210 and related examples 212) recommended to the user are the ones that are most relevant to the user so that the user can maximize his/her deductions.

Furthermore, in such embodiments, receiving the recommendations may include deleting every other instance of the category so that only the selected instance of the category is included in the recommendation. In some embodiments, the recommendation scores may range from 0 to 1. In alternative embodiments, the recommendation score may be with a different range (e.g., wider range or narrower range).

At (406), the method 400 may include receiving feedback from the user on the recommendation. For instance, in some embodiments, the feedback from the user may include selection data indicative of whether the user accepted (e.g., selected) or declined (e.g., did not select) each of the recommendations. In some embodiments, the user may provide the feedback via a user device that is executing an application (e.g., tax preparation software) associated with preparing a tax filing document (e.g., tax return).

At (408), the method 400 may include generating updated training data for the trained machine learning model based, at least in part, on the feedback received at (406). In this manner, the trained machine learning model may be iteratively re-trained each time a user interacts with the software application to provide feedback on the recommendation output by the trained machine learning model. In some embodiments, the feedback from the user on the recommendation of one or more categories of tax deductible expenses may be provided to the machine learning model in real-time.

More specifically, the feedback may be provided to the machine learning model immediately after the user decides to accept or decline the recommended category of tax deductible expenses. In alternative embodiments, the feedback may be provided to a database (such as the database 114 in FIG. 1) and provided to the machine learning in batch (e.g., all at one) at a later time.

In embodiments in which the feedback is received in real-time, the updated training data may be generated in real-time. Furthermore, in some embodiments, the trained machine learning model may be re-trained in real-time based, at least in part, on the updated training data. In this manner, the recommendation made by the trained machine learning model may be improved upon in real-time due, at least in part, to the real-time re-training of the trained machine learning model.

Example Computing Systems

Figure 5A:
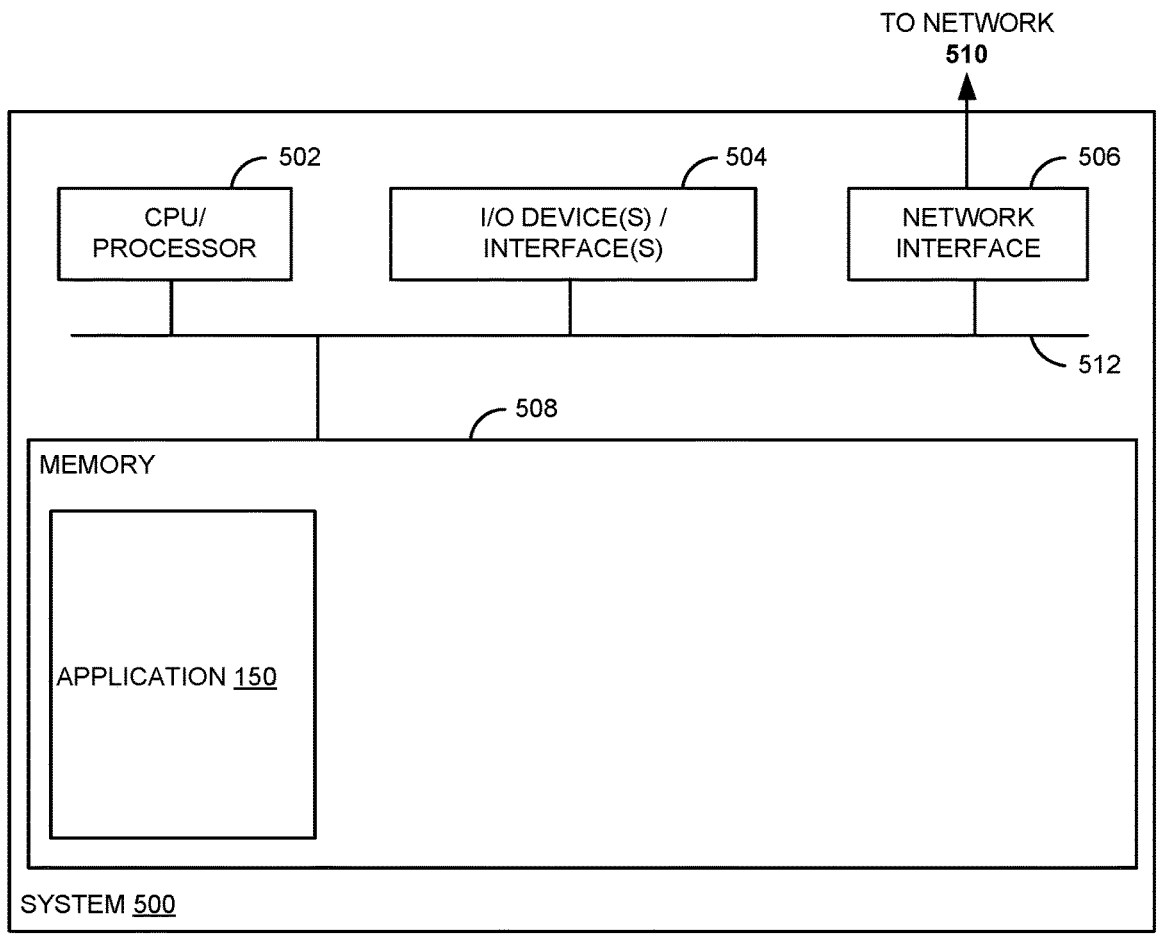
FIGS. 5A and 5B depict example processing systems according to some embodiments of the present disclosure.

FIG. 5A illustrates an example computing system 500 with which embodiments of the system for recommending to users of a software application one or more of a plurality of different categories of tax deductible expenses and related examples of tax deductible expenses for each of the one or more categories (such as the system 100 in FIG. 1) may be implemented. For example, the computing system 500 may be representative of the server 112 of FIG. 1.

The computing system 500 includes a central processing unit (CPU) 502, one or more I/O device interfaces 504 that may allow for the connection of various I/O devices 504 (e.g., keyboards, displays, mouse devices, pen input, etc.) to the computing system 500, a network interface 506, a memory 508, and an interconnect 512. It is contemplated that one or more components of the computing system 500 may be located remotely and accessed via a network 510. It is further contemplated that one or more components of the computing system 500 may include physical components or virtualized components.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508. The CPU 502 is included to be representative of a single CPU, multiple CPUs, a single CPU having multiple processing cores, and other arrangements.

Additionally, the memory 508 is included to be representative of a random access memory or the like. In some embodiments, the memory 508 may include a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, the memory 508 includes a machine learning model, which may be representative of the machine learning model 120 of FIG. 1.

Figure 5B:
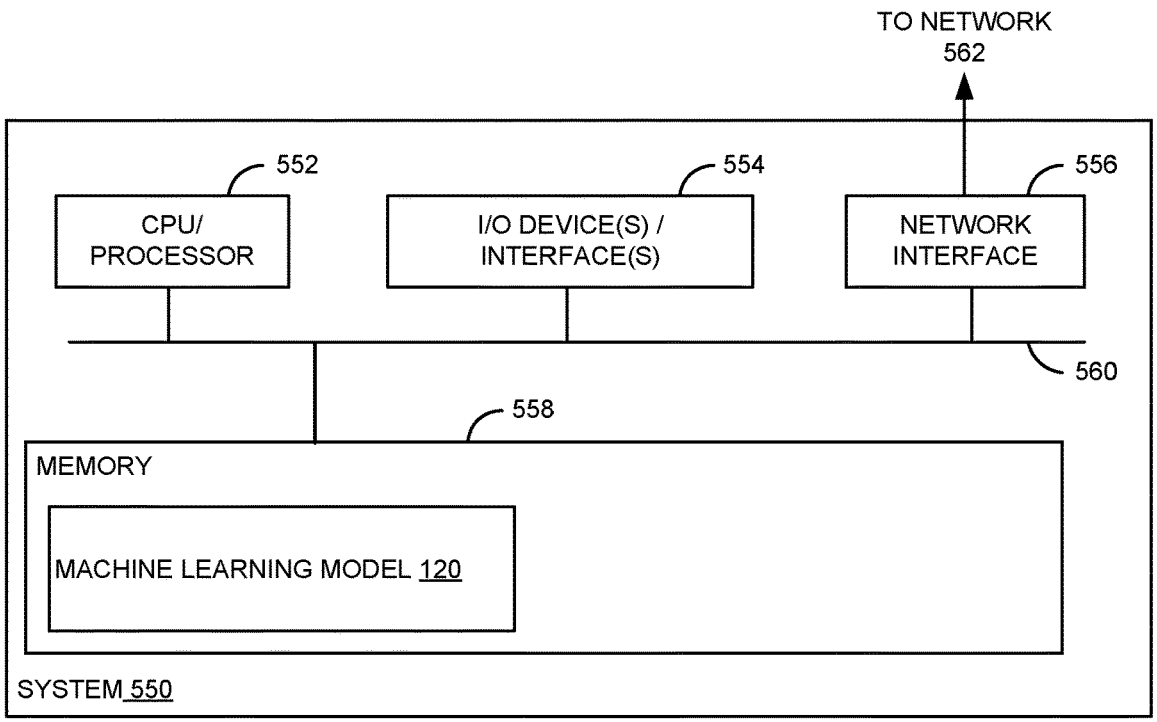

FIG. 5B illustrates an example computing system 550 with which embodiments of the system for recommending to users of a software application one or more categories of a plurality of different categories of tax deductible expenses and related examples of tax deductible expenses for each of the one or more categories (such as the system 100 in FIG. 1) may be implemented. For example, the computing system 550 may be representative of the user device 110 of FIG. 1.

The computing system 550 includes a central processing unit (CPU) 552, one or more I/O device interfaces 554 that may allow for the connection of various I/O devices 554 (e.g., keyboards, displays, mouse devices, pen input, etc.) to the computing system 550, a network interface 556, a memory 558, and an interconnect 560. It is contemplated that one or more components of the computing system 550 may be located remotely and accessed via a network 562. It is further contemplated that one or more components of the computing system 550 may include physical components or virtualized components.

The CPU 552 may retrieve and execute programming instructions stored in the memory 558. Similarly, the CPU 552 may retrieve and store application data residing in the memory 558. The interconnect 560 transmits programming instructions and application data, among the CPU 552, the I/O device interface 554, the network interface 556, the memory 558. The CPU 552 is included to be representative of a single CPU, multiple CPUs, a single CPU having multiple processing cores, and other arrangements.

Additionally, the memory 558 is included to be representative of a random access memory or the like. In some embodiments, the memory 558 may include a disk drive, solid state drive, or a collection of storage devices distributed across multiple storage systems. Although shown as a single unit, the memory 558 may be a combination of fixed and/or removable storage devices, such as fixed disc drives, removable memory cards or optical storage, network attached storage (NAS), or a storage area-network (SAN).

As shown, the memory 558 may include a software application, such as the software application 150 discussed above with reference to FIG. 1.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically recommending to self-employed users of a tax preparation software application one or more categories of a plurality of different categories of tax deductible expenses and examples of tax deductible expenses for each of the one or more categories, the method comprising:

providing a server comprising one or more processors for executing the tax preparation software, the server being in electronic communication with a computing device of each of the self-employed users and having access to a database of user information, wherein the computing device is configured to execute an application associated with the tax preparation software and is further configured to display an interface for interacting with the tax preparation software, wherein the user information comprises one or more prior tax returns filed by each respective self-employed user using the tax preparation software;

providing, by the server, first input data to a global binary classifier model, the first input data comprising a plurality of different first features associated with each of the self-employed users, wherein the plurality of different first features comprise a unique identifier for each respective self-employed user and information from the one or more prior tax returns filed by each respective self-employed user;

providing, by the server, second input data to the global binary classifier model, the second input data comprising a plurality of different second features associated with each of the self-employed users, wherein the plurality of different second features comprise an industry of each respective self-employed user, wherein the plurality of different second features further comprise a plurality of categories of tax deductible expenses, wherein each respective category of the plurality of categories is associated with examples of the tax deductible expenses and one or more industries that are associated with the respective category;

providing, by the server, third input data to the global binary classifier model, the third input data comprising, for each respective self-employed user, a plurality of tax deductible expenses selected and not selected by the respective self-employed user in the one or more prior tax returns, the third input data further comprising one or more contextual features for one or more of the self-employed users, the one or more contextual features comprising a recent life event associated with the one or more self-employed users;

training the global binary classifier model through a supervised learning process using the first input data, the second input data, and the third input data;

receiving, at the server, input data from the computing device of a first self-employed user of the plurality of self-employed users, the input data receive via user input provided via the interface of the computing device, the input data comprising the unique identifier for the first self-employed user, the industry for the first self-employed user, and the recent life event associated with the first self-employed user;

receiving, at the server, output from the global binary classifier model based, at least in part, on the input data, the output from the global binary classifier model comprising a recommendation for the first self-employed user, the recommendation comprising: (i) one or more categories of the plurality of different categories of tax deductible expenses; and (ii) a plurality of examples of tax deductible expenses for each of the one or more categories;

receiving, at the server, feedback from the first self-employed user on the recommendation, wherein the feedback comprises user selection or non-selection of one or more of the categories of tax deductible expenses;

generating, by the one or more processors, updated training data for the global binary classifier model based on the feedback; and re-training the trained global binary classifier model in real-time based on the updated training data.

2. The method of claim 1, wherein:
the recommendation includes at least a first category of tax deductible expenses and the plurality of examples of tax deductible expenses for the first category and a second category of tax deductible expenses and the plurality of examples of tax deductible expenses for the second category; and
the feedback includes selection data indicating whether the first self-employed user accepted or declined each of the first category and the second category.

3. The method of claim 1, wherein the recommendation includes a first instance of a first category of the plurality of different categories of tax deductible expenses and a second instance of the first category, and wherein the plurality of examples of tax deductibles for the first instance of the first category are different from the plurality of examples of tax deductible expenses for the second instance of the first category.

4. The method of claim 3, wherein receiving the recommendation comprises:
comparing a first recommendation score generated by the trained global binary classifier model for the first instance of the first category to a second recommendation score generated by the trained global binary classifier model for the second instance of the first category;
selecting one of the first instance of the first category or the second instance of the first category based, at least in part, on the comparing; and
deleting the other of the first instance or the second instance that is not selected.

5. The method of claim 1, wherein the the third input data further comprises timestamp data related when one or more of the plurality of different categories of tax deductible expenses were selected by the respective self-employed user in the one or more prior returns.

6. The method of claim 1, wherein the life event associated with the first self-employed user comprises at least one of a change in employment for the user, a change in marital status for the user, or a purchase of real property by the user.

7. A system for automatically recommending to self-employed users of a tax preparation software application one or more categories of a plurality of different categories of tax deductible expenses and examples of tax deductible expenses for each of the one or more categories, the system comprising:

a server comprising one or more processors for executing the tax preparation software, the server being in electronic communication with a computing device of each of the self-employed users and having access to a database of user information, wherein the computing device is configured to execute an application associated with the tax preparation software and is further configured to display an interface for interacting with the tax preparation software, wherein the user information comprises one or more prior tax returns filed by each respective self-employed user using the tax preparation software; and one or more memory configured to store computer executable instructions that, when executed by the one or more processors, cause the one or more processors to:
provide first input data to a global binary classifier model, the first input data comprising a plurality of different first features associated with each of the self-employed users, wherein the plurality of different first features comprise a unique identifier for each respective self-employed user and information from the one or more prior tax returns filed by each respective self-employed user;

provide second input data to the global binary classifier model, the second input data comprising a plurality of different second features associated with each of the self-employed users, wherein the plurality of different second features comprise an industry of each respective self-employed user, wherein the plurality of different second features further comprise a plurality of categories of tax deductible expenses, wherein each respective category of the plurality of categories is associated with examples of the tax deductible expenses and one or more industries that are associated with the respective category;

provide third input data to the global binary classifier model, the third input data comprising, for each respective self-employed user, a plurality of tax deductible expenses selected and not selected by the respective self-employed user in the one or more prior tax returns, the third input data further comprising one or more contextual features for one or more of the self-employed users, the one or more contextual features comprising a recent life event associated with the one or more self-employed users;

training the global binary classifier model through a supervised learning process using the first input data, the second input data, and the third input data;

receive input data from the computing device of a first self-employed user of the plurality of self-employed users, the input data received via user input provided via the interface of the computing device, the input data comprising the unique identifier for the first self-employed user, the industry for the first self-employed user, and the recent life event associated with the first self-employed user;

receive output from the trained global binary classifier model based, at least in part, on the input data, the output from the trained global binary classifier model comprising a recommendation for the first self-employed user, the recommendation comprising: (i) one or more categories of the plurality of different categories of tax deductible expenses; and (ii) a plurality of examples of tax deductible expenses for each of the one or more categories;
receive feedback from the first self-employed user on the recommendation, wherein the feedback comprises user selection or non-selection of one or more of the categories of tax deductible expenses; and
generate updated training data for the trained global binary classifier model based on the feedback; and
re-train the trained global binary classifier model in real-time based on the updated training data.

8. The system of claim 7, wherein:
the recommendation includes at least a first category of tax deductible expenses and the plurality of examples of tax deductible expenses for the first category and a second category of tax deductible expenses and the plurality of examples of tax deductible expenses for the second category; and
the feedback includes selection data indicating whether the user accepted or declined each of the first category and the second category.

9. The system of claim 7, wherein the recommendation includes a first instance of a first category of the plurality of different categories of tax deductible expenses and a second instance of the first category, and wherein the plurality of examples of tax deductible expenses for the first instance of the first category is different from the plurality of examples of tax deductible expenses for the second instance of the first category.

10. The system of claim 9, wherein to receive the recommendation, the one or more processors are configured to:
compare a first recommendation score generated by the trained global binary classifier model for the first instance of the first category to a second recommendation score generated by the trained global binary classifier model for the second instance of the first category;
select one of the first instance of the first category or the second instance of the first category based, at least in part, on the comparing; and
delete the other of the first instance or the second instance that is not selected.

11. The system of claim 10, wherein the first recommendation score and the second recommendation score each range from 0 to 1.

12. The system of claim 7, wherein the the third input data further comprises timestamp data related when one or more of the plurality of different categories of tax deductible expenses were selected by the respective self-employed user in the one or more prior returns.

13. A non-transitory computer readable medium comprising instructions to be executed in a computer system, wherein the instructions when executed in the computer system perform a method for automatically recommending to self-employed users of a tax preparation software application one or more categories of a plurality of different categories of tax deductible expenses and examples of tax deductible expenses for each of the one or more categories, the method comprising:
providing a server comprising one or more processors for executing the tax preparation software, the server being in electronic communication with a computing device of each of the self-employed users and having access to a database of user information, wherein the computing device is configured to execute an application associated with the tax preparation software and is further configured to display an interface for interacting with the tax preparation software, wherein the user information comprises one or more prior tax returns filed by each respective self-employed user using the tax preparation software;
providing, by the server, first input data to a global binary classifier model, the first input data comprising a plurality of different first features associated with each of the self-employed users, wherein the plurality of different first features comprise a unique identifier for each respective self-employed user and information from the one or more prior tax returns filed by each respective self-employed user;
providing, by the server, second input data to the global binary classifier model, the second input data comprising a plurality of different second features associated with each of the self-employed users, wherein the plurality of different second features comprise an industry of each respective self-employed user, wherein the plurality of different second features further comprise a plurality of categories of tax deductible expenses, wherein each respective category of the plurality of categories is associated with examples of the tax deductible expenses and one or more industries that are associated with the respective category;
providing, by the server, third input data to the global binary classifier model, the third input data comprising, for each respective self-employed user, a plurality of tax deductible expenses selected and not selected by the respective self-employed user in the one or more prior tax returns, the third input data further comprising one or more contextual features for one or more of the self-employed users, the one or more contextual features comprising a recent life event associated with the one or more self-employed users;
training the global binary classifier model through a supervised learning process using the first input data, the second input data, and the third input data;
receiving, at the server, input data from the computing device of a first self-employed user of the plurality of self-employed users, the input data receive via user input provided via the interface of the computing device, the input data comprising the unique identifier for the first self-employed user, the industry for the first self-employed user, and the recent life event associated with the first self-employed user;
receiving, at the server, output from the global binary classifier model based, at least in part, on the input data, the output from the global binary classifier model comprising a recommendation for the first self-employed user, the recommendation comprising: (i) one or more categories of the plurality of different categories of tax deductible expenses; and (ii) a plurality of examples of tax deductible expenses for each of the one or more categories;
receiving, at the server, feedback from the first self-employed user on the recommendation, wherein the feedback comprises user selection or non-selection of one or more of the categories of tax deductible expenses;
generating, by the one or more processors, updated training data for the global binary classifier model based on the feedback; and
re-training the trained global binary classifier model in real-time based on the updated training data.

14. The non-transitory computer readable medium of claim 13, wherein:
   the recommendation includes a first category of tax deductible expenses and the plurality of examples of tax deductible expenses for the first category and a second category of tax deductible expenses and the plurality of examples of tax deductible expenses for the second category; and
   the feedback includes selection data indicating whether the first self-employed user accepted or declined each of the first category and the second category.

\* \* \* \* \*